(12) United States Patent
Bigbee et al.

(10) Patent No.: US 11,777,978 B2
(45) Date of Patent: Oct. 3, 2023

(54) METHODS AND SYSTEMS FOR ACCURATELY ASSESSING APPLICATION ACCESS RISK

(71) Applicant: vArmour Networks, Inc., Los Altos, CA (US)

(72) Inventors: Paul Bigbee, Palo Alto, CA (US); Marc Woolward, Bude (GB); Hsisheng Wang, Taipei (TW); Keith Stewart, San Francisco, CA (US); Jason Parry, San Francisco, CA (US)

(73) Assignee: vArmour Networks, Inc., Los Altos, CA (US)

( * ) Notice: Subject to any disclaimer, the term of this patent is extended or adjusted under 35 U.S.C. 154(b) by 291 days.

(21) Appl. No.: 17/162,769

(22) Filed: Jan. 29, 2021

(65) Prior Publication Data
US 2022/0247774 A1    Aug. 4, 2022

(51) Int. Cl.
*H04L 9/40* (2022.01)
*G06F 16/901* (2019.01)
*G06F 16/23* (2019.01)

(52) U.S. Cl.
CPC .......... *H04L 63/1433* (2013.01); *G06F 16/23* (2019.01); *G06F 16/9024* (2019.01);
(Continued)

(58) Field of Classification Search
CPC . H04L 63/1433; H04L 63/102; H04L 63/104; H04L 63/105; H04L 63/20; G06F 16/23; G06F 16/9024
See application file for complete search history.

(56) References Cited

U.S. PATENT DOCUMENTS 6,253,321 B1    6/2001  Nikander et al.
6,484,261 B1   11/2002  Wiegel
(Continued)

FOREIGN PATENT DOCUMENTS

TW    201642616 A    12/2016
TW    201642617 A    12/2016
(Continued)

OTHER PUBLICATIONS

"International Search Report" and "Written Opinion of the International Searching Authority," Patent Cooperation Treaty Application No. PCT/US2016/024116, dated May 3, 2016, 12 pages.
(Continued)

*Primary Examiner* — Matthew Smithers
*Assistant Examiner* — Shu Chun Gao
(74) *Attorney, Agent, or Firm* — Carr & Ferrell LLP (57) ABSTRACT

Systems and methods for assessing an application access risk are provided. An example method commences with collecting data concerning relationships between an application, one or more client devices, and one or more users in a computing environment. The method includes updating a graph database including nodes and edges. The nodes represent the application, the one or more client devices, and the one or more users and the edges represent relationships between the application, the one or more client devices, and the one or more users. The method continues with enriching the graph database by associating the nodes with metadata including information concerning the one or more users accessing the application from the one or more client devices. The method further includes analyzing the graph database to identify a subset of nodes used to access the application and displaying a graphical representation of the subset of nodes.

21 Claims, 6 Drawing Sheets

(52) U.S. Cl.
CPC .......... *H04L 63/102* (2013.01); *H04L 63/104* (2013.01); *H04L 63/105* (2013.01); *H04L 63/20* (2013.01)

(56) References Cited

U.S. PATENT DOCUMENTS

| | | |
|---|---|---|
| 6,578,076 B1 | 6/2003 | Putzolu |
| 6,765,864 B1 | 7/2004 | Natarajan et al. |
| 6,970,459 B1 | 11/2005 | Meier |
| 6,981,155 B1 | 12/2005 | Lyle et al. |
| 7,058,712 B1 | 6/2006 | Vasko et al. |
| 7,062,566 B2 | 6/2006 | Amara et al. |
| 7,096,260 B1 | 8/2006 | Zavalkovsky et al. |
| 7,373,524 B2 | 5/2008 | Motsinger et al. |
| 7,397,794 B1 | 7/2008 | Lacroute et al. |
| 7,467,408 B1 | 12/2008 | O'Toole, Jr. |
| 7,475,424 B2 | 1/2009 | Lingafelt et al. |
| 7,516,476 B1 | 4/2009 | Kraemer et al. |
| 7,519,062 B1 | 4/2009 | Kloth et al. |
| 7,627,671 B1 | 12/2009 | Palma |
| 7,694,181 B2 | 4/2010 | Noller et al. |
| 7,725,937 B1 | 5/2010 | Levy |
| 7,742,414 B1 | 6/2010 | Iannaccone et al. |
| 7,774,837 B2 | 8/2010 | McAlister |
| 7,849,495 B1 | 12/2010 | Huang et al. |
| 7,900,240 B2 | 3/2011 | Terzis et al. |
| 7,904,454 B2 | 3/2011 | Raab |
| 7,996,255 B1 | 8/2011 | Shenoy et al. |
| 8,051,460 B2 | 11/2011 | Lum et al. |
| 8,112,304 B2 | 2/2012 | Scates |
| 8,254,381 B2 | 8/2012 | Allen et al. |
| 8,259,571 B1 | 9/2012 | Raphel et al. |
| 8,291,495 B1 | 10/2012 | Burns et al. |
| 8,296,459 B1 | 10/2012 | Brandwine et al. |
| 8,307,422 B2 | 11/2012 | Varadhan et al. |
| 8,321,862 B2 | 11/2012 | Swamy et al. |
| 8,353,021 B1 | 1/2013 | Satish et al. |
| 8,369,333 B2 | 2/2013 | Hao et al. |
| 8,396,986 B2 | 3/2013 | Kanada et al. |
| 8,429,647 B2 | 4/2013 | Zhou |
| 8,468,113 B2 | 6/2013 | Harrison et al. |
| 8,490,153 B2 | 7/2013 | Bassett et al. |
| 8,494,000 B1 | 7/2013 | Nadkarni et al. |
| 8,499,330 B1 | 7/2013 | Albisu et al. |
| 8,528,091 B2 | 9/2013 | Bowen et al. |
| 8,539,548 B1 | 9/2013 | Overby, Jr. et al. |
| 8,565,118 B2 | 10/2013 | Shukla et al. |
| 8,612,744 B2 | 12/2013 | Shieh |
| 8,661,434 B1 | 2/2014 | Liang et al. |
| 8,677,496 B2 | 3/2014 | Wool |
| 8,688,491 B1 | 4/2014 | Shenoy et al. |
| 8,726,343 B1 | 5/2014 | Borzycki et al. |
| 8,730,963 B1 | 5/2014 | Grosser, Jr. et al. |
| 8,798,055 B1 | 8/2014 | An |
| 8,813,169 B2 | 8/2014 | Shieh |
| 8,813,236 B1 | 8/2014 | Saha et al. |
| 8,819,762 B2 | 8/2014 | Harrison et al. |
| 8,898,788 B1 | 11/2014 | Aziz et al. |
| 8,935,457 B2 | 1/2015 | Feng et al. |
| 8,938,782 B2 | 1/2015 | Sawhney et al. |
| 8,990,371 B2 | 3/2015 | Kalyanaraman et al. |
| 9,009,829 B2 | 4/2015 | Stolfo et al. |
| 9,015,299 B1 | 4/2015 | Shah |
| 9,021,546 B1 | 4/2015 | Banerjee |
| 9,027,077 B1 | 5/2015 | Bharali et al. |
| 9,036,639 B2 | 5/2015 | Zhang |
| 9,060,025 B2 | 6/2015 | Xu |
| 9,141,625 B1 | 9/2015 | Thornewell et al. |
| 9,191,327 B2 | 11/2015 | Shieh et al. |
| 9,258,275 B2 | 2/2016 | Sun et al. |
| 9,294,302 B2 | 3/2016 | Sun et al. |
| 9,294,442 B1 | 3/2016 | Lian et al. |
| 9,361,089 B2 | 6/2016 | Bradfield et al. |
| 9,380,027 B1 | 6/2016 | Lian et al. |
| 9,405,665 B1 | 8/2016 | Shashi et al. |
| 9,407,602 B2 | 8/2016 | Feghali et al. |
| 9,521,115 B1 | 12/2016 | Woolward |
| 9,609,083 B2 | 3/2017 | Shieh |
| 9,621,595 B2 | 4/2017 | Lian et al. |
| 9,680,852 B1 | 6/2017 | Wager et al. |
| 9,762,599 B2 | 9/2017 | Wager et al. |
| 9,794,289 B1 | 10/2017 | Banerjee et al. |
| 9,973,472 B2 | 5/2018 | Woolward et al. |
| 10,009,317 B2 | 6/2018 | Woolward |
| 10,009,381 B2 | 6/2018 | Lian et al. |
| 10,091,238 B2 | 10/2018 | Shieh et al. |
| 10,116,441 B1 | 10/2018 | Rubin et al. |
| 10,191,758 B2 | 1/2019 | Ross et al. |
| 10,193,929 B2 | 1/2019 | Shieh et al. |
| 10,264,025 B2 | 4/2019 | Woolward |
| 10,333,827 B2 | 6/2019 | Xu et al. |
| 10,333,986 B2 | 6/2019 | Lian et al. |
| 10,382,467 B2 | 8/2019 | Wager et al. |
| 10,528,897 B2 | 1/2020 | Labat et al. |
| 10,630,703 B1 | 4/2020 | Ghosh et al. |
| 10,755,334 B2 | 8/2020 | Eades et al. |
| 10,862,748 B1 | 12/2020 | Deruijter |
| 11,140,061 B1 * | 10/2021 | Sanders ............. G06F 21/577 |
| 11,194,815 B1 | 12/2021 | Kumar et al. |
| 11,290,493 B2 | 3/2022 | Woolward et al. |
| 11,290,494 B2 | 3/2022 | Li et al. |
| 11,310,284 B2 | 4/2022 | Woolward et al. |
| 2002/0031103 A1 | 3/2002 | Wiedeman et al. |
| 2002/0066034 A1 | 5/2002 | Schlossberg et al. |
| 2003/0055950 A1 | 3/2003 | Cranor et al. |
| 2003/0177389 A1 | 9/2003 | Albert et al. |
| 2004/0062204 A1 | 4/2004 | Bearden et al. |
| 2004/0095897 A1 | 5/2004 | Vafaei |
| 2004/0172557 A1 | 9/2004 | Nakae et al. |
| 2005/0021943 A1 | 1/2005 | Ikudome et al. |
| 2005/0033989 A1 | 2/2005 | Poletto et al. |
| 2005/0114829 A1 | 5/2005 | Robin et al. |
| 2005/0154576 A1 | 7/2005 | Tarui |
| 2005/0190758 A1 | 9/2005 | Gai et al. |
| 2005/0201343 A1 | 9/2005 | Sivalingham et al. |
| 2005/0246241 A1 | 11/2005 | Irizarry, Jr. et al. |
| 2005/0283823 A1 | 12/2005 | Okajo et al. |
| 2006/0005228 A1 | 1/2006 | Matsuda |
| 2006/0037077 A1 | 2/2006 | Gadde et al. |
| 2006/0050696 A1 | 3/2006 | Shah et al. |
| 2007/0016945 A1 | 1/2007 | Bassett et al. |
| 2007/0019621 A1 | 1/2007 | Perry et al. |
| 2007/0022090 A1 | 1/2007 | Graham |
| 2007/0064617 A1 | 3/2007 | Reves |
| 2007/0079308 A1 | 4/2007 | Chiaramonte et al. |
| 2007/0130566 A1 | 6/2007 | Van Rietschote |
| 2007/0157286 A1 | 7/2007 | Singh et al. |
| 2007/0162400 A1 | 7/2007 | Brew et al. |
| 2007/0168971 A1 | 7/2007 | Royzen et al. |
| 2007/0192861 A1 | 8/2007 | Varghese et al. |
| 2007/0192863 A1 | 8/2007 | Kapoor et al. |
| 2007/0198656 A1 | 8/2007 | Mazzaferri et al. |
| 2007/0239987 A1 | 10/2007 | Hoole et al. |
| 2007/0271612 A1 | 11/2007 | Fang et al. |
| 2007/0277222 A1 | 11/2007 | Pouliot |
| 2008/0016339 A1 | 1/2008 | Shukla |
| 2008/0016550 A1 | 1/2008 | McAlister |
| 2008/0083011 A1 | 4/2008 | McAlister et al. |
| 2008/0155239 A1 | 6/2008 | Chowdhury et al. |
| 2008/0163207 A1 | 7/2008 | Reumann et al. |
| 2008/0195670 A1 | 8/2008 | Boydstun |
| 2008/0229382 A1 | 9/2008 | Vitalos |
| 2008/0239961 A1 | 10/2008 | Hilerio et al. |
| 2008/0301770 A1 | 12/2008 | Kinder |
| 2008/0307110 A1 | 12/2008 | Wainner et al. |
| 2009/0077621 A1 | 3/2009 | Lang et al. |
| 2009/0077666 A1 | 3/2009 | Chen et al. |
| 2009/0083445 A1 | 3/2009 | Ganga |
| 2009/0138316 A1 | 5/2009 | Weller et al. |
| 2009/0165078 A1 | 6/2009 | Samudrala et al. |
| 2009/0190585 A1 | 7/2009 | Allen et al. |
| 2009/0249470 A1 | 10/2009 | Litvin et al. |
| 2009/0260051 A1 | 10/2009 | Igakura |
| 2009/0268667 A1 | 10/2009 | Gandham et al. |

(56) References Cited

U.S. PATENT DOCUMENTS

| | | |
|---|---|---|
| 2009/0328187 A1 | 12/2009 | Meisel |
| 2010/0043068 A1 | 2/2010 | Varadhan et al. |
| 2010/0064341 A1 | 3/2010 | Aldera |
| 2010/0071025 A1 | 3/2010 | Devine et al. |
| 2010/0088738 A1 | 4/2010 | Birnbach |
| 2010/0095367 A1 | 4/2010 | Narayanaswamy |
| 2010/0191863 A1 | 7/2010 | Wing |
| 2010/0192223 A1 | 7/2010 | Ismael et al. |
| 2010/0192225 A1 | 7/2010 | Ma et al. |
| 2010/0199349 A1 | 8/2010 | Ellis |
| 2010/0208699 A1 | 8/2010 | Lee et al. |
| 2010/0228962 A1 | 9/2010 | Simon et al. |
| 2010/0235880 A1 | 9/2010 | Chen et al. |
| 2010/0274970 A1 | 10/2010 | Treuhaft et al. |
| 2010/0281539 A1 | 11/2010 | Burns et al. |
| 2010/0287544 A1 | 11/2010 | Bradfield et al. |
| 2010/0333165 A1 | 12/2010 | Basak et al. |
| 2011/0003580 A1 | 1/2011 | Belrose et al. |
| 2011/0022812 A1 | 1/2011 | van der Linden et al. |
| 2011/0069710 A1 | 3/2011 | Naven et al. |
| 2011/0072486 A1 | 3/2011 | Hadar et al. |
| 2011/0090915 A1 | 4/2011 | Droux et al. |
| 2011/0113472 A1 | 5/2011 | Fung et al. |
| 2011/0138384 A1 | 6/2011 | Bozek et al. |
| 2011/0138441 A1 | 6/2011 | Neystadt et al. |
| 2011/0184993 A1 | 7/2011 | Chawla et al. |
| 2011/0225624 A1 | 9/2011 | Sawhney et al. |
| 2011/0249679 A1 | 10/2011 | Lin et al. |
| 2011/0263238 A1 | 10/2011 | Riley et al. |
| 2012/0017258 A1 | 1/2012 | Suzuki |
| 2012/0113989 A1 | 5/2012 | Akiyoshi |
| 2012/0130936 A1 | 5/2012 | Brown et al. |
| 2012/0131685 A1 | 5/2012 | Broch et al. |
| 2012/0185913 A1 | 7/2012 | Martinez et al. |
| 2012/0207174 A1 | 8/2012 | Shieh |
| 2012/0216273 A1 | 8/2012 | Rolette et al. |
| 2012/0278903 A1 | 11/2012 | Pugh |
| 2012/0284792 A1 | 11/2012 | Liem |
| 2012/0297383 A1 | 11/2012 | Meisner et al. |
| 2012/0311144 A1 | 12/2012 | Akelbein et al. |
| 2012/0311575 A1 | 12/2012 | Song |
| 2012/0324567 A1 | 12/2012 | Couto et al. |
| 2013/0019277 A1 | 1/2013 | Chang et al. |
| 2013/0054536 A1 | 2/2013 | Sengupta |
| 2013/0081142 A1 | 3/2013 | McDougal et al. |
| 2013/0086399 A1 | 4/2013 | Tychon et al. |
| 2013/0097138 A1 | 4/2013 | Barkol et al. |
| 2013/0097692 A1 | 4/2013 | Cooper et al. |
| 2013/0145465 A1 | 6/2013 | Wang et al. |
| 2013/0151680 A1 | 6/2013 | Salinas et al. |
| 2013/0166490 A1 | 6/2013 | Elkins et al. |
| 2013/0166720 A1 | 6/2013 | Takashima et al. |
| 2013/0198799 A1 | 8/2013 | Staggs et al. |
| 2013/0219384 A1 | 8/2013 | Srinivasan et al. |
| 2013/0223226 A1 | 8/2013 | Narayanan et al. |
| 2013/0250956 A1 | 9/2013 | Sun et al. |
| 2013/0263125 A1 | 10/2013 | Shamsee et al. |
| 2013/0275592 A1 | 10/2013 | Xu et al. |
| 2013/0276092 A1 | 10/2013 | Sun et al. |
| 2013/0283336 A1 | 10/2013 | Macy et al. |
| 2013/0291088 A1 | 10/2013 | Shieh et al. |
| 2013/0298181 A1 | 11/2013 | Smith et al. |
| 2013/0298184 A1 | 11/2013 | Ermagan et al. |
| 2013/0318617 A1 | 11/2013 | Chaturvedi et al. |
| 2013/0343396 A1 | 12/2013 | Yamashita et al. |
| 2014/0007181 A1 | 1/2014 | Sarin et al. |
| 2014/0022894 A1 | 1/2014 | Oikawa et al. |
| 2014/0033267 A1 | 1/2014 | Aciicmez |
| 2014/0096229 A1 | 4/2014 | Burns et al. |
| 2014/0137240 A1 | 5/2014 | Smith et al. |
| 2014/0153577 A1 | 6/2014 | Janakiraman et al. |
| 2014/0157352 A1 | 6/2014 | Paek et al. |
| 2014/0250524 A1 | 9/2014 | Meyers et al. |
| 2014/0282027 A1 | 9/2014 | Gao et al. |
| 2014/0282518 A1 | 9/2014 | Banerjee |
| 2014/0283030 A1 | 9/2014 | Moore et al. |
| 2014/0310765 A1 | 10/2014 | Stuntebeck et al. |
| 2014/0337743 A1 | 11/2014 | Branton |
| 2014/0344435 A1 | 11/2014 | Mortimore, Jr. et al. |
| 2015/0047046 A1 | 2/2015 | Pavlyushchik |
| 2015/0058983 A1 | 2/2015 | Zeitlin et al. |
| 2015/0082417 A1 | 3/2015 | Bhagwat et al. |
| 2015/0124606 A1 | 5/2015 | Alvarez et al. |
| 2015/0163088 A1 | 6/2015 | Anschutz |
| 2015/0180894 A1 | 6/2015 | Sadovsky et al. |
| 2015/0180949 A1 | 6/2015 | Maes |
| 2015/0229641 A1 | 8/2015 | Sun et al. |
| 2015/0235229 A1 | 8/2015 | Pryor |
| 2015/0249676 A1 | 9/2015 | Koyanagi et al. |
| 2015/0269383 A1 | 9/2015 | Lang et al. |
| 2015/0295943 A1 | 10/2015 | Malachi |
| 2016/0028851 A1 | 1/2016 | Shieh |
| 2016/0162179 A1 | 6/2016 | Annett et al. |
| 2016/0173521 A1 | 6/2016 | Yampolskiy et al. |
| 2016/0191466 A1 | 6/2016 | Pernicha |
| 2016/0191545 A1 | 6/2016 | Nanda et al. |
| 2016/0203331 A1 | 7/2016 | Khan et al. |
| 2016/0234250 A1 | 8/2016 | Ashley et al. |
| 2016/0269442 A1 | 9/2016 | Shieh |
| 2016/0294774 A1 | 10/2016 | Woolward et al. |
| 2016/0294875 A1 | 10/2016 | Lian et al. |
| 2016/0323245 A1 | 11/2016 | Shieh et al. |
| 2016/0337390 A1 | 11/2016 | Sridhara et al. |
| 2016/0350105 A1 | 12/2016 | Kumar et al. |
| 2016/0357424 A1 | 12/2016 | Pang et al. |
| 2016/0357774 A1 | 12/2016 | Gauchi et al. |
| 2017/0005986 A1 | 1/2017 | Bansal et al. |
| 2017/0063795 A1 | 3/2017 | Lian et al. |
| 2017/0085654 A1 | 3/2017 | Mikhailov et al. |
| 2017/0118218 A1 | 4/2017 | Koottayi |
| 2017/0134422 A1 | 5/2017 | Shieh et al. |
| 2017/0168864 A1 | 6/2017 | Ross et al. |
| 2017/0180421 A1 | 6/2017 | Shieh et al. |
| 2017/0195454 A1 | 7/2017 | Shieh |
| 2017/0208100 A1 | 7/2017 | Lian et al. |
| 2017/0223033 A1 | 8/2017 | Wager et al. |
| 2017/0223038 A1 | 8/2017 | Wager et al. |
| 2017/0251013 A1 | 8/2017 | Kirti |
| 2017/0279770 A1 | 9/2017 | Woolward |
| 2017/0302685 A1 | 10/2017 | Ladnai et al. |
| 2017/0339188 A1 | 11/2017 | Jain et al. |
| 2017/0374032 A1 | 12/2017 | Woolward et al. |
| 2017/0374101 A1 | 12/2017 | Woolward |
| 2018/0005296 A1 | 1/2018 | Eades et al. |
| 2018/0083977 A1 | 3/2018 | Murugesan et al. |
| 2018/0095976 A1 | 4/2018 | Shelksohn |
| 2018/0191779 A1 | 7/2018 | Shieh et al. |
| 2018/0232262 A1 | 8/2018 | Chowdhury et al. |
| 2019/0043534 A1 | 2/2019 | Sievert |
| 2019/0052549 A1 | 2/2019 | Duggal et al. |
| 2019/0081963 A1 | 3/2019 | Waghorn |
| 2019/0095310 A1* | 3/2019 | Liran .................... H04L 67/535 |
| 2019/0141075 A1 | 5/2019 | Gay |
| 2019/0273746 A1 | 9/2019 | Coffing |
| 2019/0278760 A1 | 9/2019 | Smart |
| 2019/0317728 A1 | 10/2019 | Chen et al. |
| 2019/0342307 A1 | 11/2019 | Gamble et al. |
| 2019/0394225 A1 | 12/2019 | Vajipayajula et al. |
| 2020/0043008 A1 | 2/2020 | Hrabik |
| 2020/0065343 A1 | 2/2020 | Morkovine |
| 2020/0074078 A1 | 3/2020 | Saxe et al. |
| 2020/0076826 A1* | 3/2020 | Ford ....................... H04L 63/12 |
| 2020/0145441 A1* | 5/2020 | Patterson .............. G06F 18/231 |
| 2020/0145447 A1* | 5/2020 | Coffey ................ H04L 63/1425 |
| 2020/0169565 A1 | 5/2020 | Badawy et al. |
| 2020/0259852 A1 | 8/2020 | Wolff |
| 2020/0285546 A1* | 9/2020 | Kraplanee ........... G06F 11/1466 |
| 2020/0382363 A1 | 12/2020 | Woolward et al. |
| 2020/0382556 A1 | 12/2020 | Woolward et al. |
| 2020/0382557 A1 | 12/2020 | Woolward et al. |
| 2020/0382560 A1 | 12/2020 | Woolward et al. |
| 2020/0382586 A1 | 12/2020 | Badawy et al. |
| 2021/0099490 A1* | 4/2021 | Crabtree ............. H04L 63/1408 |
| 2021/0120029 A1 | 4/2021 | Ross et al. |

(56) References Cited

U.S. PATENT DOCUMENTS

| | | | |
|---|---|---|---|
| 2021/0168150 A1 | 6/2021 | Ross et al. | |
| 2021/0200840 A1* | 7/2021 | Kannan | G06F 8/73 |
| 2022/0201024 A1 | 6/2022 | Ross et al. | |
| 2022/0201025 A1 | 6/2022 | Ross et al. | |
| 2022/0245256 A1 | 8/2022 | Wang et al. | |
| 2022/0311460 A1 | 9/2022 | Azin et al. | |

FOREIGN PATENT DOCUMENTS

| | | |
|---|---|---|
| TW | 201642618 A | 12/2016 |
| TW | 201703483 A | 1/2017 |
| TW | 201703485 A | 1/2017 |
| WO | WO2002098100 A1 | 12/2002 |
| WO | WO2016148865 A1 | 9/2016 |
| WO | WO2016160523 A1 | 10/2016 |
| WO | WO2016160533 A1 | 10/2016 |
| WO | WO2016160595 A1 | 10/2016 |
| WO | WO2016160599 A1 | 10/2016 |
| WO | WO2017100365 A1 | 6/2017 |

OTHER PUBLICATIONS

"International Search Report" and "Written Opinion of the International Searching Authority," Patent Cooperation Treaty Application No. PCT/US2016/024300, dated May 3, 2016, 9 pages.

"International Search Report" and "Written Opinion of the International Searching Authority," Patent Cooperation Treaty Application No. PCT/US2016/024053, dated May 3, 2016, 12 pages.

"International Search Report" and "Written Opinion of the International Searching Authority," Patent Cooperation Treaty Application No. PCT/US2016/019643, dated May 6, 2016, 27 pages.

Dubrawsky, Ido, "Firewall Evolution—Deep Packet Inspection," Symantec, Created Jul. 28, 2003; Updated Nov. 2, 2010, symantec.com/connect/articles/firewall-evolution-deep-packet-inspection, 3 pages.

"International Search Report" and "Written Opinion of the International Searching Authority," Patent Cooperation Treaty Application No. PCT/US2016/024310, dated Jun. 20, 2016, 9 pages.

"Feature Handbook: NetBrain® Enterprise Edition 6.1" NetBrain Technologies, Inc., Feb. 25, 2016, 48 pages.

Arendt, Dustin L. et al., "Ocelot: User-Centered Design of a Decision Support Visualization for Network Quarantine", IEEE Symposium on Visualization for Cyber Security (VIZSEC), Oct. 25, 2015, 8 pages.

"International Search Report" and "Written Opinion of the International Searching Authority," Patent Cooperation Treaty Application No. PCT/US2016/065451, dated Jan. 12, 2017, 20 pages.

Maniar, Neeta, "Centralized Tracking and Risk Analysis of 3rd Party Firewall Connections," SANS Institute InfoSec Reading Room, Mar. 11, 2005, 20 pages.

Hu, Hongxin et al., "Detecting and Resolving Firewall Policy Anomalies," IEEE Transactions on Dependable and Secure Computing, vol. 9, No. 3, May/Jun. 2012, pp. 318-331.

Woolward et al., "Template-Driven Intent-Based Security," U.S. Appl. No. 16/428,838, filed May 31, 2019, Specification, Claims, Abstract, and Drawings, 60pages.

Woolward et al., "Validation of Cloud Security Policies," U.S. Appl. No. 16/428,849, filed May 31, 2019, Specification, Claims, Abstract, and Drawings, 54 pages.

Woolward et al., "Reliability Prediction for Cloud Security Policies," U.S. Appl. No. 16/428,858, filed May 31, 2019, Specification, Claims, Abstract, and Drawings, 59 pages.

Bates, Adam Macneil, "Designing and Leveraging Trustworthy Provenance-Aware Architectures", ProQuest Dissertations and Theses ProQuest Dissertations Publishing, 2017, 147 pages.

Wang et al., "System and Method for Attributing User Behavior from Multiple Technical Telemetry Sources," U.S. Appl. No. 17/162,761, filed Jan. 29, 2021; Specification, Claims, Abstract, and Drawings, 31 pages.

* cited by examiner

METHODS AND SYSTEMS FOR ACCURATELY ASSESSING APPLICATION ACCESS RISK

TECHNICAL FIELD

The present disclosure relates generally to data processing and, more particularly, to systems and methods for accurately assessing an application access risk.

BACKGROUND

Enterprises use computer networks for providing services and content and offering products. The computer networks can connect both low-risk assets and critical enterprise assets. The low-risk assets can be vulnerable to hacker attacks, computer viruses, and malicious software that may lead to loss or leak of critical data. To get to the critical data, attackers can target low-risk assets in order to enter the internal network. Inside the internal network and behind the hardware firewall, attackers can move across the internal network to gain access to critical enterprise assets.

To analyze whether users are allowed to access applications, conventional identity management solutions typically present information about user behavior or users that have accessed the applications. This approach can allow a department manager or administrator to decide whether user access is appropriate and set or change the user access as needed, however the department administrator is often not the individual responsible for the security of the systems being accessed. Normally, access management for users is focused on the user. However, access management to critical applications and services requires governance from central security experts or the team charged with providing those systems. Therefore, a system is required to empower those individuals in making access management decisions.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for assessing an application access risk. According to an example embodiment, a method for assessing an application access risk may include collecting data concerning relationships between an application and one or more client devices and users in a computing environment. The method may further include collecting data concerning relationships between the application and one or more users logged into the one or more client devices in the computing environment. The method may then continue with enriching data related to the one or more client devices with the one or more users logged into the one or more client device. The method may also include updating a graph database that includes nodes and edges. The nodes may represent the application and the one or more client devices and the one or more users which are connected to the one or more client devices and the edges may represent relationships between the application, the one or more client devices, and relationships between the application and the one or more user. The method may continue with enriching the graph database by associating the nodes with metadata. The metadata may include information concerning the one or more users accessing the application from the one or more client devices, organizational units in which the users work and roles the users perform, attributes associated with the one or more users, and permissions associated with the one or more users. The method may further include analyzing the graph database to identify a subset of nodes used to access the application and displaying, via a graphical user interface, a graphical representation of the subset of nodes.

The method may further include determining that the subset of the nodes includes at least one node representing at least one of a client device, a user, and a group of users not allowed to have access to the application and, in response to the determination, providing a warning message to a least one authorized person.

The method may further include determining that the subset of the nodes includes at least one node representing a client device of a user not allowed to have access to the application or at least one node representing a user not allowed to have access to the application. In response to the determination, generating a security policy disallowing a relationship between the application and the at least one node may be generated. The at least one node may be associated with one of the client device, the user, or a group of users defined within the metadata by organizational units, roles, and groups.

The method may further include analyzing the graph database to identify a further subset of nodes allowed to have access to the application and not used to access the application. Based on the metadata, organizational units corresponding to the nodes of the further subset may be identified. In response to identification of the organizational units, a report concerning one or more of the organizational units, groups, and the roles corresponding to the nodes of the further subset may be provided to at least one authorized person. A security policy disallowing a relationship between the application and at least one node of the further subset associated with a user of the one or more users may be generated.

The method may further include generating of whitelist rules (also known as Zero Trust) explicitly identifying the users and client devices which should be permitted and require access to the application, and generating a whitelist set of Role-Based Access Control permissions to enforce that required access and no other access.

Based on the metadata, organizational units corresponding to the nodes of the subset of nodes used to access the application may be identified and a report concerning the organizational units may be provided to at least one authorized person.

The method may further include determining, based on the metadata, a number and types of transactions performed by users of at least one of the organizational units and providing a report concerning the number and the types of transactions to at least one authorized person.

The metadata may include information concerning roles of the one or more users and an association of the one or more users with one or more organizational units of an enterprise, types and timestamps of transactions performed by the one or more users using the application, data concerning amount of data written to or read from the application, operations conducted within sessions, network logs of logins of the users into the application, and so forth.

According to another embodiment, a system for assessing an application access risk is provided. The system may include at least one processor and a memory storing processor-executable codes. The at least one processor can be configured to implement the operations of the above-mentioned method for assessing an application access risk.

According to yet another aspect of the disclosure, there is provided a non-transitory processor-readable medium, which stores processor-readable instructions. When the processor-readable instructions are executed by a processor, they cause the processor to implement the above-mentioned method for assessing an application access risk.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure provides methods and systems for assessing application access risk, which includes comparing the access observed in an application to the access permitted by Role Based Access Control (RBAC) permissions and the requirements of an organization for separation of access. By presenting visualizations, reports, and analyses from the application's perspective, the technology disclosed herein enables a holistic assessment of the risks to the application itself. The proposed system collects data concerning relationships between an application and client devices and relationships between the application and users logged into the client devices in a computing environment. The collected data are used to update a graph database that stores nodes and relationships, where the nodes represent the application, the client devices, and user objects and edges represent relationships between the application and the client devices, and relationships between the application and the users. The graph database is further enriched by associating the nodes with metadata that includes information concerning users accessing the application from the client devices. This means that the telemetry produced on the client device of the user can be attributed to the user according to the techniques described in the concurrently filed U.S. patent application Ser. No. 17/162,761 titled "Systems and methods for attributing user behavior from multiple technical telemetry sources." The proposed system may analyze the graph database to identify a subset of nodes used to access the application and display a graphical representation of the subset of nodes, both the client device and the user. Based on the analysis of the graph database, the system may generate a security policy disallowing a relationship between the application and at least one node of the subset of nodes, predominantly users or groups of users. The security policy can be in the form of a 'blacklist' disallowing specific relationships or in the form of a 'whitelist' (known as Zero Trust) which specifies only the permitted relationships.

Figure 1:
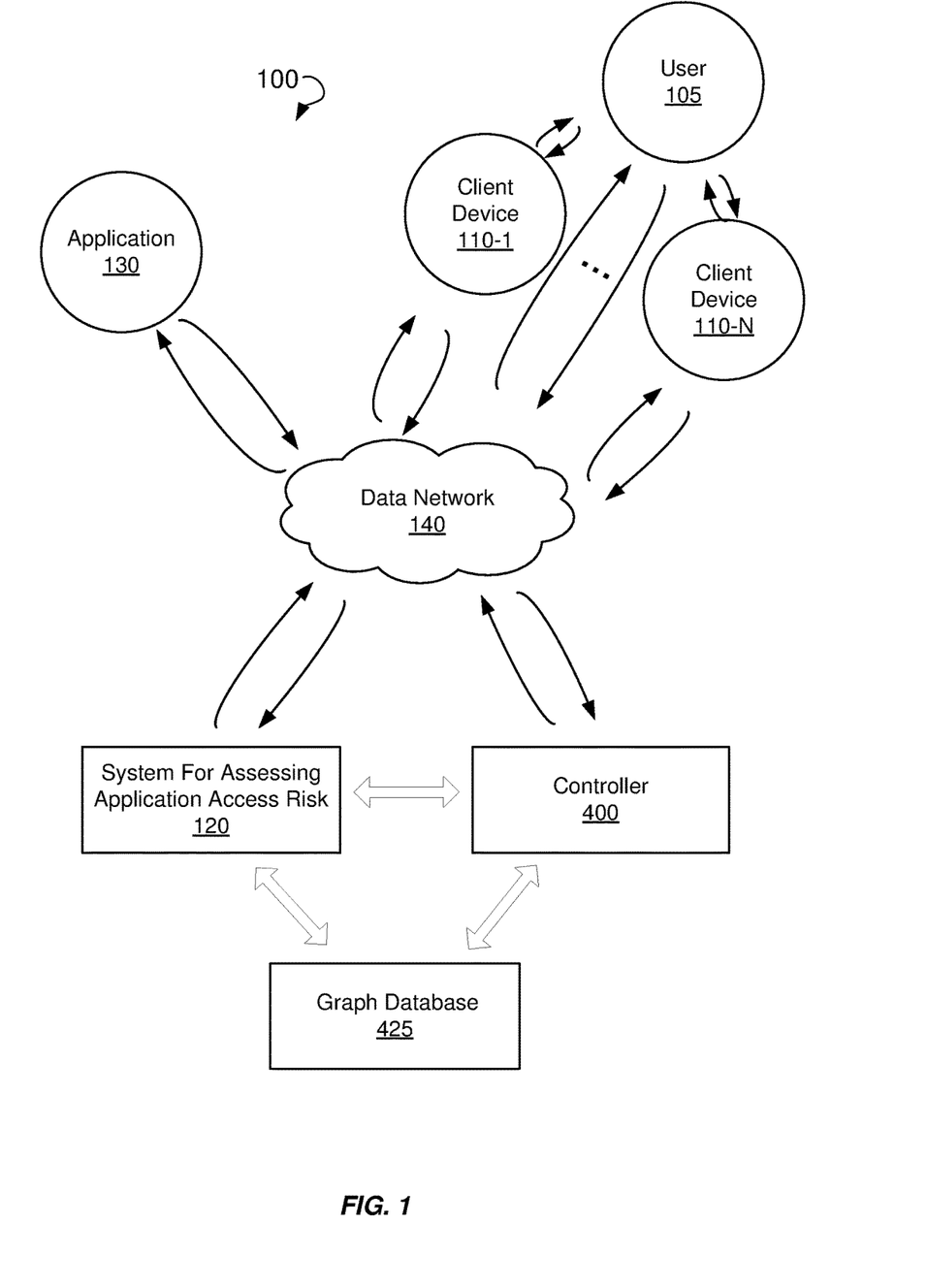
FIG. 1 is a block diagram of an environment, in which systems and methods for assessing an application access risk can be implemented, according to some example embodiments.

Referring now to the drawings, FIG. 1 is a block diagram of a computing environment 100, in which systems and methods for assessing application access risk can be implemented, according to some example embodiments. The computing environment 100 may include a user 105, client devices 110-$i$ (i=1, . . . , N), a system 120 for assessing application access risk, an application 130, a controller 400, and a graph database 425. The client devices 110-$i$ (i=1, . . . , N) can be associated with one or more clients shows as the user 105. As used herein, a user is represented by user account credentials which can be associated with a human being, specific role, or software agent. The client devices 110-$i$ (i=1, . . . , N) may communicate with each other via a data network 140. The client devices 110-$i$ (i=1, . . . , N) may have one or more applications, servlets, and other components running on the client devices 110-$i$ (i=1, . . . , N) and may run on different networked platforms.

The data network 140 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network 140 can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The controller 400 may track connections and relationships between the client devices 110-$i$ ($i=1, \ldots, N$) and the application 130, store the information about client devices 110-$i$ ($i=1, \ldots, N$) and the relationships between each client device and the application 130 in a graph database 425, and manage security policies in the computing environment 100. In response to the determination that the client device is being utilized by the user 105, the controller 400 can track the relationship between the user 105 and the application 130, and continue to do so overtime as the user 105 connects from different client devices 110-$i$ ($i=1, \ldots, N$). The graph database 425 may include nodes and edges. The nodes may represent client devices 110-$i$ ($i=1, \ldots, N$) and the application 130. The edges may represent relationships between the client devices 110-$i$ ($i=1, \ldots, N$) and the application 130 and relationships between the application 130 and the user 105. Details of the controller 400 and the graph database 425 are described in connection with FIG. 4.

The nodes in graph database 425 can be enriched by associating the nodes with metadata that include information concerning users accessing the application 130 from the client devices 110-$i$ ($i=1, \ldots, N$). The metadata may include information on roles, groups, and permissions of the users and an association of the users of the client devices 110-$i$ ($i=1, \ldots, N$) with one or more organizational units of an enterprise, and types and timestamps of business transactions performed by the users using the application 130. The metadata may further include network logs of logins of the users associated with the client devices 110-$i$ ($i=1, \ldots, N$) into the application 130. The metadata may further include data concerning an amount of data written to or read from the application 130 by the client devices 110-$i$ ($i=1, \ldots, N$).

In an example embodiment, the client devices 110-$i$ ($i=1, \ldots, N$) may include bare metal servers, cloud service instances, containers, mobile devices, laptops, Internet-of-Things devices, and so forth.

Based on the metadata including information concerning users, the system 120 can determine whether the client device associated with a user has one or more vulnerabilities that would allow hackers to attack and infect with computer viruses and malicious software. An indication that the client device has a vulnerability may include a role or administrative permission of the user and association of the user with one or more organizational units of an enterprise, and types and timestamps of business transactions performed by the user while using the client device, a number of transactions performed by users of at least one of the organizational units, network logs of logins of the users into the application, data concerning amount of data written to or read from the application, information provided to the controller by vulnerability management systems and scanners via an application programming interface (API), and so forth.

The system 120 can be configured to receive a user query. The user query can be provided in a natural human language. Examples of the user query may include "show me all client connections to my database that performed a large number of transactions," "show me all client connections to my database that have written a large amount of data to the application," and so forth. The user query may include a name of a specific application running on the client devices, a type of application running on the client devices, a specific client device, a range of geodata associated with client devices, a type of a connection (secure or unsecure) between the client devices and the application, a data classification, an operational classification, and so forth. In an example embodiment, the metadata may be determined automatically via API connectors to third-party authoritative sources.

In response to the user query, the system 120 may determine, using metadata, a subset of the nodes in graph database 425 that were used to access the application 130. The system 120 can further display, via a graphical user interface, a graphical representation of the subset of nodes. The system 120 can be configured to receive a further user query narrowing the parameters and analyze the graph database based on the updated parameters.

In some embodiments, the system 120 can be implemented as part of the controller 400. The system 120 can generate a security policy based on the determination that the nodes representing users are not allowed to have access to the application. The security policy can be generated based on a subset of the nodes and the subset of relationships. The security policy may disallow or allow at least one relationship between the application and the one or more nodes. The allowing of the at 9730US least one relationship may be based on whitelists and blacklists. The controller 400 may apply the security policy within the computing environment 100.

In some embodiments, the system 120 can be implemented as part of the controller 400. The system 120 can generate a security policy based on the determination that nodes representing client devices are not allowed to have access to the application. The security policy can be generated based on a subset of the nodes and the subset of relationships. The security policy may disallow or allow at least one relationship between the application and the one or more nodes. The allowing of the at least one relationship may be based on whitelists and blacklists. The controller 400 may apply the security policy within the computing environment 100.

Figure 2:
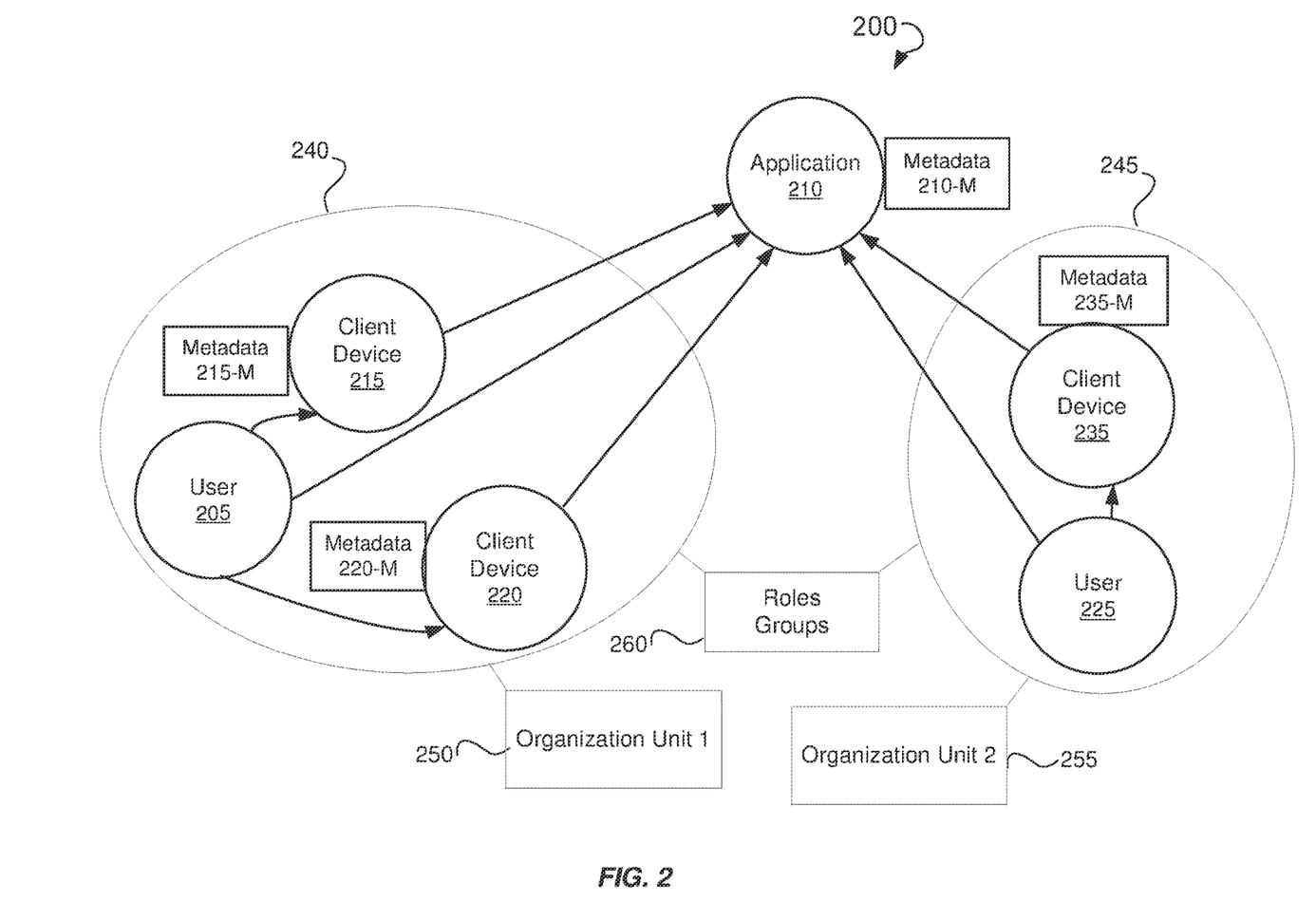
FIG. 2 is a simplified graph database of a computing environment, in accordance with some embodiments.

FIG. 2 is a simplified graph database 200 of a computing environment, in accordance with some embodiments. The graph database 200 includes nodes representing an application 210, client devices 215, 220, a user 205 associated with the client devices 215, 220, client device 235, and a user 225 associated with the client device 235. The application 210 can be run on one of the computing instances, such as a workload, client device, bare-metal server, cloud-based instance, mobile client device, Internet of Things (IoT) device, point of delivery (PoD), one of middleware devices, and so forth. Edges in the graph database 200 may represent relationships between the application 210 and client devices 215, 220, and 235 and relationships between the application 210 and the users 205 and 225. An example relationship may include data network connection between application 210 and client devices 215, 220, and 235.

The graph database 200 can be enriched with metadata 210-M associated with the application 210 and metadata 215-M, 220-M, and 235-M associated with the client devices 215, 220, and 235, respectively. The metadata 210-M, 215-M, 220-M, and 235-M may include information concerning users 205 and 225 accessing the application 210 from the client devices 215, 220, and 235. The metadata 210-M, 215-M, 220-M, and 235-M can be collected by controller 400 from logs 470 (shown in FIG. 4). The metadata 210-M, 215-M, 220-M, and 235-M may include user login names, an association of the users with one or more organizational units, information on roles of the user within the organizational units, types and timestamps of business transactions performed by the users using the application, and for forth.

The metadata may also include information concerning connections between the application 210 and the client devices 215, 220, and 235. The information concerning the connections can be used to determine relationships between the nodes. For example, if the application 210 communicates with the client devices 215, 220, and 235, via an API gateway, the application 210 and the client devices 215, 220, and 235 need to identify, authenticate, and authorize each other. The application 210 and the client devices 215, 220, and 235 may pass a set of credentials and establish a set of tokens, Jason web tokens to allow the client devices 215, 220, and 235 to transact with the application 210. The relationships between the application 210 and the client devices 215, 220, and 235 can be mapped based on flow telemetry. The relationships can be attributed meanings based of semantics of identity, such as a person identity.

The controller can analyze the metadata concerning users accessing the application from the client devices 215, 220, and 235 to determine a subset 245 of nodes including client devices 215 and 220, which are utilized by users of a first organizational unit 250 of an enterprise and a subset 245 of nodes including client device 235 which is utilized by a user of a second organizational unit 255 of the enterprise. The controller may determine users and roles and groups 260 of the users associated with each organizational unit.

The controller can analyze the graph database to identify a further subset of nodes allowed to have access to the application 210 and not used to access the application 210. Based on the metadata, the controller may identify organizational units and/or roles, separately, corresponding to the nodes of the further subset representing users and provide a report concerning the organizational units corresponding to the nodes of the further subset to at least one authorized person. The controller can generate a security policy disallowing a relationship between the application 210 and at least one node, i.e., a user, of the further subset.

In an example embodiment, the controller can identify, based on the metadata, organizational units corresponding to the nodes of the subset of users accessing the application. Upon identifying the organizational units, the controller may provide a report concerning the organizational units to at least one authorized person.

In a further example embodiment, the controller can determine, based on the metadata, a number and type of transactions performed by users of at least one of the organizational units. Upon determination of the number of transactions, the controller may provide a report concerning the number and type of transactions to at least one authorized person. For the purposes of incident management and forensics analysis, the report can also be generated based on the activities of a single user or a group of users within the same role.

In an example embodiment, the controller can determine that the subset of the nodes includes at least one node representing a client device of a user not allowed to have access to the application. In response to the determination, the controller can provide a warning message to a least one authorized person. In a further example embodiment, in response to the determination, the controller can generate a security policy disallowing a relationship between the application and the at least one node. The allowing or disallowing relationship may be made by means of a whitelist specifying users allowed access, or by means of a blacklist disallowing access.

In other embodiments, the subset 240 may include client devices used by users performing a first role in the enterprise and the subset 245 may include client devices used by users performing a second role in the enterprise. The subset 240 may represent potentially vulnerable nodes if security rules of the enterprise prohibit using the same application or access the same data by users with different roles or business functions within the enterprise.

The roles of users, groups of users within the enterprise, and applications used by the enterprise are not static. The users may also be members of overlapping groups. Therefore, the graph database needs to be constantly updated and analyzed to determine inappropriate combinations of roles of users and overlapping groups.

Some embodiments may allow assessing the relationships between the client devices and environments. The environments may include groups of employees within an enterprise, groups of applications used by the enterprise, groups of customers of the enterprise, and so forth. Certain embodiments may allow detecting attempts or potential exploits to gain access between different environments. The detection of potential exploits may be implemented with monitoring policies, so if anybody in the future attempts to gain access between different environments, an authorized person can be notified immediately. The detection of potential exploits may also allow creating a security policy. The security policy may allow only those relationships that have been established and validated, and disallow creation of any other relationships in the future.

Some embodiments may allow, upon identifying current relationships between different environments, review of the relationships between the application and the client devices or the relationships between the application and users and creating a baseline. The baseline may include currently allowed relationships. The baseline may be used to generate a policy to be enforced by Identity and Access Management (IAM) systems (such as Kerberos, Active Directory, or third party IAM management systems such as Sailpoint) or used to identify deviations in behavior at runtime. The graph database can be constantly updated based on metadata collected from network logs and analyzed to detect deviations from the baseline, for example, where a user transitions between organization units but still retains their previous access patterns.

The graph database can be analyzed to determine relationships between the application and the client device that relate to an individual user, users of a specific role, or users belonging to specific groups. The result of this analysis may allow providing a view of functions of a department, division, and members of the certain roles within the enterprise.

Thus, the controller analyzes information associated with the application and analyzes user access telemetry, and presents a graphical representation of the subset of nodes used to access the application to an authorized person, such as an owner of the application. The authorized person can make a decision on whether the organizational units (e.g., departments) or individual users are allowed to access the application and use that information to inform operational decisions. The authorized person may determine why users access the application that the users are not expected to access. The authorized person can also create security policies to restrict users outside the organization unit from accessing the application. The security policy may also provide a privilege to one or more specific users outside the organization unit to access the application.

The controller provides the authorized person with identity access management governance by visualizing user access, providing control of the security policies, allowing the authorized person to set a baseline for allowed relationships between the application and the client devices, and notifying the authorized person if there is any deviation from the baseline.

In an example embodiment, roles of uses may be stored in a database. The role may include description of actions that the user is entitled to perform according to the role. Even though the user may be allowed to perform a number of actions according to the role of the user, the user may not necessarily perform all of the actions allowed to be performed by the user. Furthermore, the user may perform some actions only once (e.g., when accessing the application for the first time).

The system may provide a graphical representation or a machine-based representation (e.g., in JSON) of actions of the user with respect to the application the user is entitled to perform and actions that the user actually performed with respect to the application. Therefore, the system analyzes the activity and behavior of users, and analyzes the information related to the access of the users to the application and actions performed by the users with respect to the application. Permissions provided to the user based on the role may be compared with access of the user to the application and actions performed by the user with respect to the application. If it is determined that a part of permissions is not used by the user (e.g., if the user never performed one or more actions allowed to the user in the permissions with respect to the application), the authorized person may decide to remove one or more actions from the user permissions. Changing permission for user access by disallowing the one or more actions that have been never performed by the user of a particular role or users of a particular organizational unit may help reduce security risk associated with the application. Therefore, the system enables comparing permissions given to a user and permissions used by the user, determining that the permissions provided to the user are broader than necessary (i.e., some permissions are never used by the user), and allows limiting the permissions.

Moreover, the analysis of the access to the application by the users can be utilized to determine that some functionalities or data associated with the application have never been used by the user. In response to the determination, an authorized person may remove user's permissions to use functionalities or data in the application.

Figure 3:
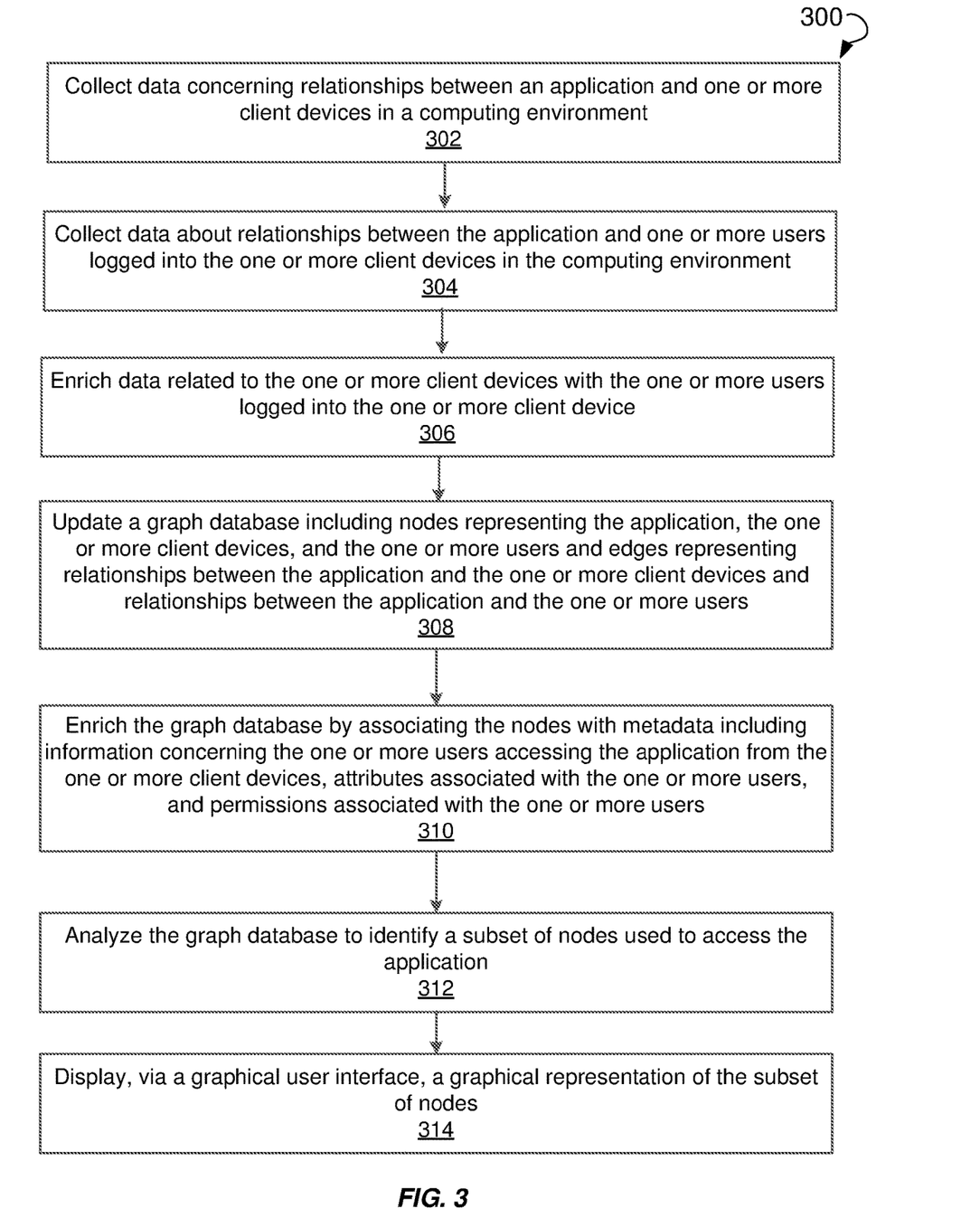
FIG. 3 is a flow chart showing a method for assessing an application access risk, according to an example embodiment.

FIG. 3 is a flow chart of a method 300 for assessing an application access risk, according to some example embodiments. The method 300 can be performed by the system 120 for assessing an application access risk in computing environment 100 of FIG. 1. The method 300 may commence in block 302 with collecting data concerning relationships between an application and one or more client devices in a computing environment. In block 304, the method 300 may proceed with collecting data concerning relationships between the application and one or more users logged into the one or more client devices in the computing environment. The method 300 may continue, in block 306, with enriching data related to the one or more client devices with the one or more users logged into the one or more client device. In block 308, the method 300 may proceed with updating a graph database that includes nodes and edges. The nodes may represent the application, the one or more client devices, and the one or more users, and the edges may represent relationships between the application and the one or more client devices and relationships between the application and the one or more users.

In block 310, the method 300 may proceed with enriching the graph database by associating the nodes with metadata. The metadata may include information concerning the one or more users accessing the application from the one or more client devices, attributes associated with the one or more users, and permissions associated with the one or more users. In an example embodiment, the metadata may further include information concerning roles of the one or more users and association of the one or more users with one or more organizational units of an enterprise, and types and timestamps of transactions performed by the one or more users using the application. In some example embodiments, the metadata may include network logs of logins of the one or more users into the application. In an example embodiment, the metadata may include data concerning an amount of data written to or read from the application.

In block 312, the method 300 may proceed with analyzing the graph database to identify a subset of nodes used to access the application. The method 300 may include displaying, via a graphical user interface, a graphical representation of the subset of nodes in block 314.

In an example embodiment, the method 300 may further include determining that the subset of the nodes includes at least one node representing at least one of a client device, a user, and a group of users not allowed to have access to the application. In response to the determination, a warning message may be provided to a least one authorized person.

In a further example embodiment, the method 300 may include determining that the subset of the nodes includes at least one node representing a client device of a user not allowed to have access to the application or includes at least one node representing a user not allowed to have access to the application. In response to the determination, a security policy disallowing a relationship between the application and the at least one node can be generated. The at least one node may be associated with one of the client device, user, or group of users defined within the metadata by organizational units, roles, and groups.

The method 300 may further include analyzing the graph database to identify a further subset of nodes allowed to have access to the application and not used to access the application. Furthermore, organizational units corresponding to the nodes of further subset may be identified based on the metadata. Upon the analysis and identification of the organizational units, a report concerning the organizational units corresponding to the nodes of further subset may be provided to at least one authorized person. Moreover, upon the analysis and identification of the organizational units, a security policy disallowing a relationship between the application and at least one node of the further subset may be generated.

The method 300 may further include generating whitelist rules identifying at least one user of the one or more users and at least one client device of the one or more client devices permitted to access the application. Based on the whitelist rules, a whitelist set of role-based access control permissions to enforce the access may be generated.

Additionally, organizational units corresponding to the nodes of the subset of nodes used to access the application may be identified based on the metadata. Upon identification of the organizational units, a report concerning the organizational units may be provided to at least one authorized person.

In a further example embodiment, a number and types of transactions performed by users of at least one of the organizational units may be determined based on the metadata. Upon determining the number and the types of transactions, a report concerning the number of transactions and the types of operation may be provided to at least one authorized person.

Figure 4:
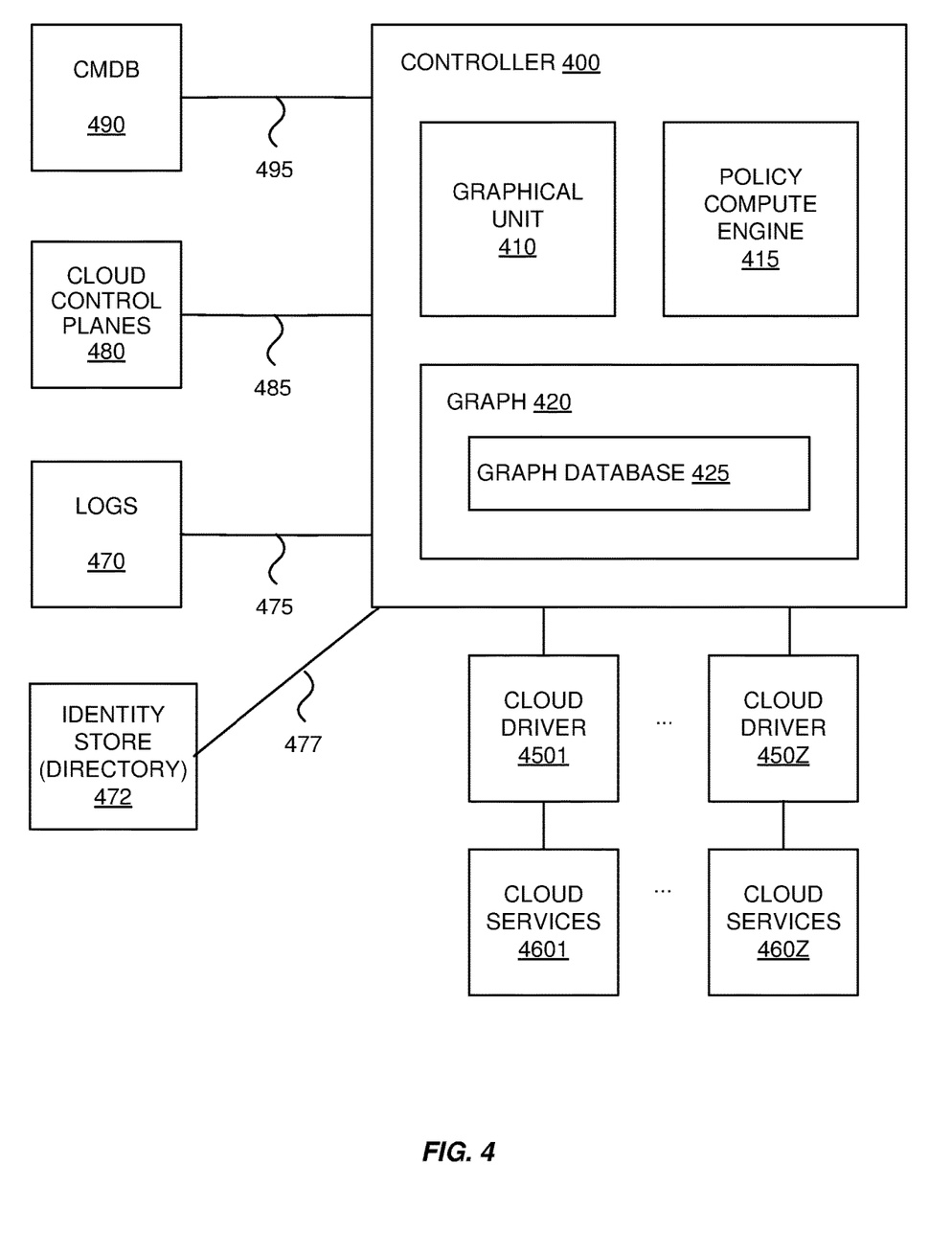
FIG. 4 shows a controller associated with a system for assessing an application access risk, according to an example embodiment.

FIG. 4 shows a controller 400, according to an example embodiment. The controller 400 can receive streaming telemetry 475 from logs 470, events 485 from cloud control plane 480, inventory 495 from configuration management database (CMDB) 490, and metadata from authoritative sources within the environment (such as a security scanner for vulnerabilities, a Governance, Risk and Compliance (GRC) tool for recovery time requirements and regulatory status and obligations associated with a node, or directory services for organizational and role membership of users).

Logs 470 can be data sources such as flow logs from cloud services 4601-460Z (e.g., Amazon Web Services (AWS), Microsoft Azure, and Google Cloud Platform (GCP)), vArmour DSS Distributed Security System, Software Defined Networking (SDN) (e.g., VMware NSX and Cisco Application Centric Infrastructure (ACI)), monitoring agents (e.g., Tanium, Crowdstrike, and Falco), and the like. In addition, user access logs can be retrieved from data sources such as Kerberos, Lightweight Directory Access Protocol (LDAP), Active Directory, IAM platforms such as Okta and cloud access, and identity systems such as Azure AD and Amazon IAM log. Generally, streaming telemetry 475 can be low-level data concerning relationships between applications and access to services. Streaming telemetry 475 can include 5-tuple, layer 7 (application layer) process information, management plane logs, and the like. 5-tuple refers to a set of five different values that comprise a TCP/IP connection: a source IP address/port number, destination IP address/port number, and the protocol in use. Streaming telemetry 475 can alternatively or additionally include a volume of data (i.e., how much data there is or how many data packets there are) exchanged between workloads (e.g., a physical computing system, a virtual machine, a container, and combinations thereof) in a network, dates and times at which communications (e.g., data packets) are exchanged between workloads, and the like. User access logs also provide information related to the account and additional metadata associated with operations conducted (for example, READing an object within an object store).

Cloud control plane 480 establishes and controls the network and computing resources within a computing environment (e.g., computing environment 100 in FIG. 1). Cloud control plane 480 can include interfaces for managing assets (e.g., launching virtual machines and/or containers, configuring the network, etc.) in a computing environment. For example, cloud control plane 480 can include one or more instances of container orchestration, such as Docker Swarm®, Kubernetes®, Amazon EC2 Container Service (ECS), Diego, and Apache® Mesos™. By way of further non-limiting examples, cloud control plane 480 can include VMware vSphere, APIs provided by cloud services 4601-460Z, and the like.

Events 485 can include information about a container being created, having a state change, having an error, and the like. For example, when a container is created, information about the workload such as a service name, image deployed, and the like can be received in events 485. By way of further example, additional information from an image registry corresponding to the deployed image can be gathered by controller 400.

The CMDB 490 can be a database of information about the hardware and software components (also known as assets) used in a computing environment (e.g., computing environment 100 in FIG. 1) and relationships between those components and business functions. CMDB 490 can include information about upstream sources or dependencies of components and the downstream targets of components. For example, inventory 495 can be used to associate an application name and other information (e.g., regulatory requirements, business unit ownership, business criticality, and the like) with the workload it is running on.

For the purposes of identity, an identity store (directory) 472 (such as LDAP) is utilized to provide metadata associated with the organizational membership of the user, including organizational unit membership, roles, groups, permissions, and administrative status.

Streaming identity 477, telemetry 475, events 485, and inventory 495 can be ingested by graph 420. Graph 420 normalizes information received in streaming telemetry 475, events 485, and inventory 495 into a standard data format and/or model stored in a graph database 425. Graph database 425 uses a graph data model comprised of nodes (also referred to as vertices), which are entities such as workloads, and edges, which represent the relationship between two nodes. Edges can be referred to as relationships. An edge can have a start node, end node, type, and direction, and an edge can describe parent-child relationships, actions, ownership, and the like. In contrast to relational databases, relationships are (most) important in graph database 425. In other words, connected data is equally (or more) important than individual data points.

Conventionally, security management systems store raw logs of each and every individual communication between workloads. The amount of data is scaled linearly and consumes massive amounts of storage. In contrast, streaming telemetry 475, events 485, and inventory 495 can be used by graph 420 to create and update graph database 425. The individual communications may not be stored. This way, graph database 425 is advantageously scalable. For example, a graph database 425 for large computing environments of 30,000-50,000 workloads can be stored in a memory of a workload.

A graphical unit 410 can visually present information from graph database 425 to users according to various criteria, such as by application, application type, organization, and the like. The graphical unit 410 can visually organize information from graph database 425. In some embodiments, nodes that behave similarly can be clustered together (i.e., be put in a cluster). For example, when two nodes have similar edges (relationships) and behave in a similar fashion (e.g., run the same application, are associated with the same organization, and the like), the two nodes can be clustered together. Nodes that are clustered together can be visually presented as a shape (e.g., circle, rectangle, and the like), which denotes that there are a certain number of workloads fulfilling the same function, instead of presenting a shape for each workload in the cluster.

The policy compute engine 415 can use information in the graph database 425 to design security policies, also referred to herein as policies. The policy compute engine 415 can produce multiple security policies, each reflecting independent pieces of security logic that can be implemented by the policy compute engine 415. Security policies can implement security controls, for example, to protect an application wherever it is in a computing environment (e.g., computing environment 100 in FIG. 1). A security policy can specify what is to be protected ("nouns") (for example, applications run for a particular organization). A security policy can further specify a security intent ("verbs"), that is, how to protect. For example, a security intent can be to implement Payment Card Industry Data Security Standard (PCI DSS) network segmentation requirements (a regulatory requirement), implement security best practices for databases, implement a whitelist architecture, and the like. By way of further example, a security intent can be specified in a template by a user (responsible for system administration, security, and the like).

Cloud drivers 4501-450Z can serve as an interface between the policy compute engine 415 (having a centralized security policy) and cloud services 4601-4760Z. In other words, cloud drivers 4501-450Z implement the security policy using different facilities (e.g., APIs) and capabilities available from cloud services 4601-460Z.

Figure 5:
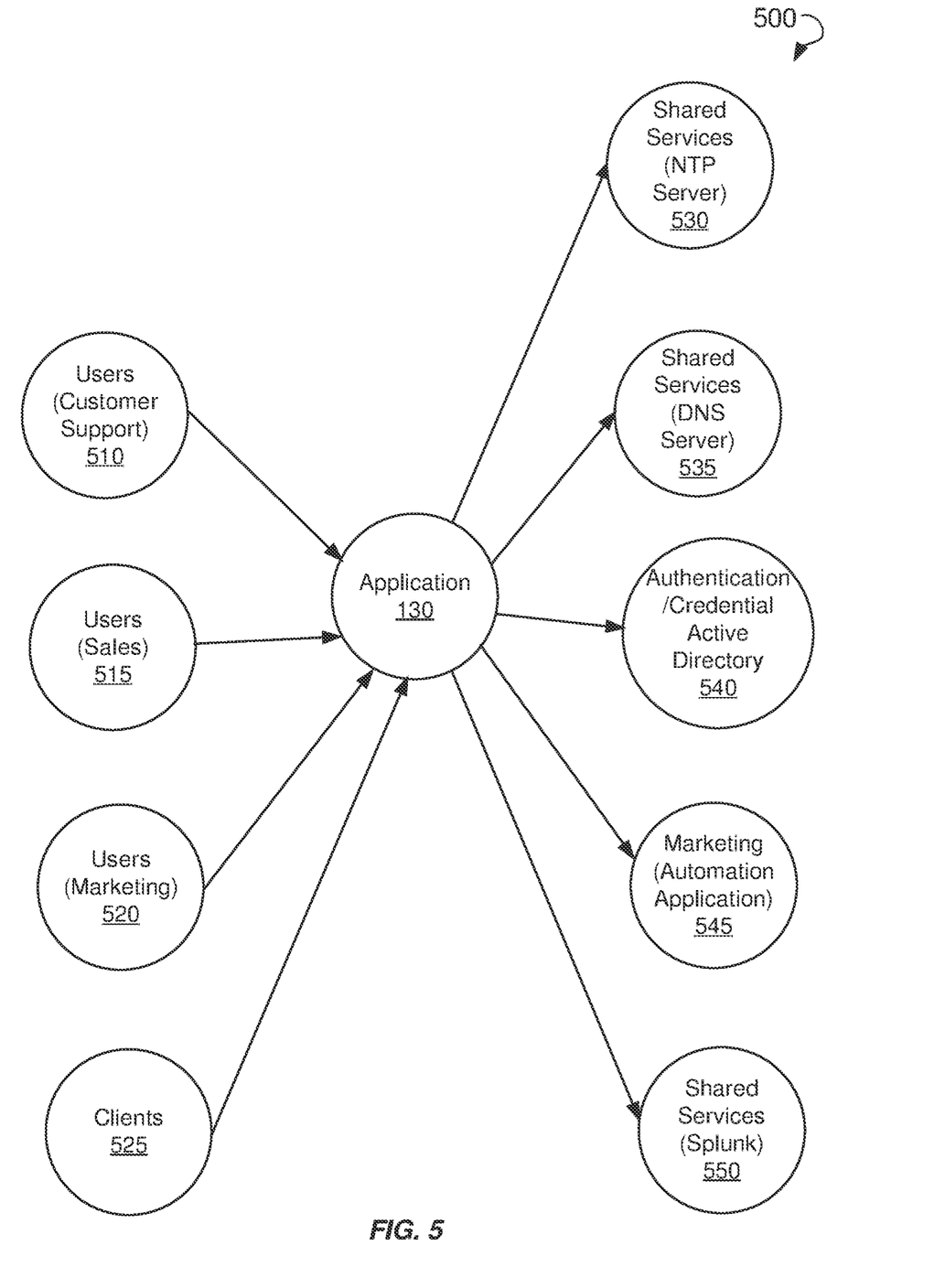
FIG. 5 is a schematic diagram of a graph illustrating relationships between nodes, according to an example embodiment.

FIG. 5 is a schematic diagram showing relationships 500 between nodes in a graph, according to an example embodiment. A node representing an application 130 may be connected with (i.e., may have relationships with) a plurality of nodes representing users. The users may include users 510 of a customer support department, users 515 of a sales department, users 520 of a marketing department, and clients 525. The application 130 may be connected with (i.e., may have relationships with) a plurality of services provided by the application 130. The services may include shared services 530 associated with a Network Time Protocol (NTP) server, shared services 535 associated with a Domain Name System (DNS) server, authentication/credential active directory 540, marketing services 545 (e.g., an automation application), and shared services 550 associated with a Splunk service.

Figure 6:
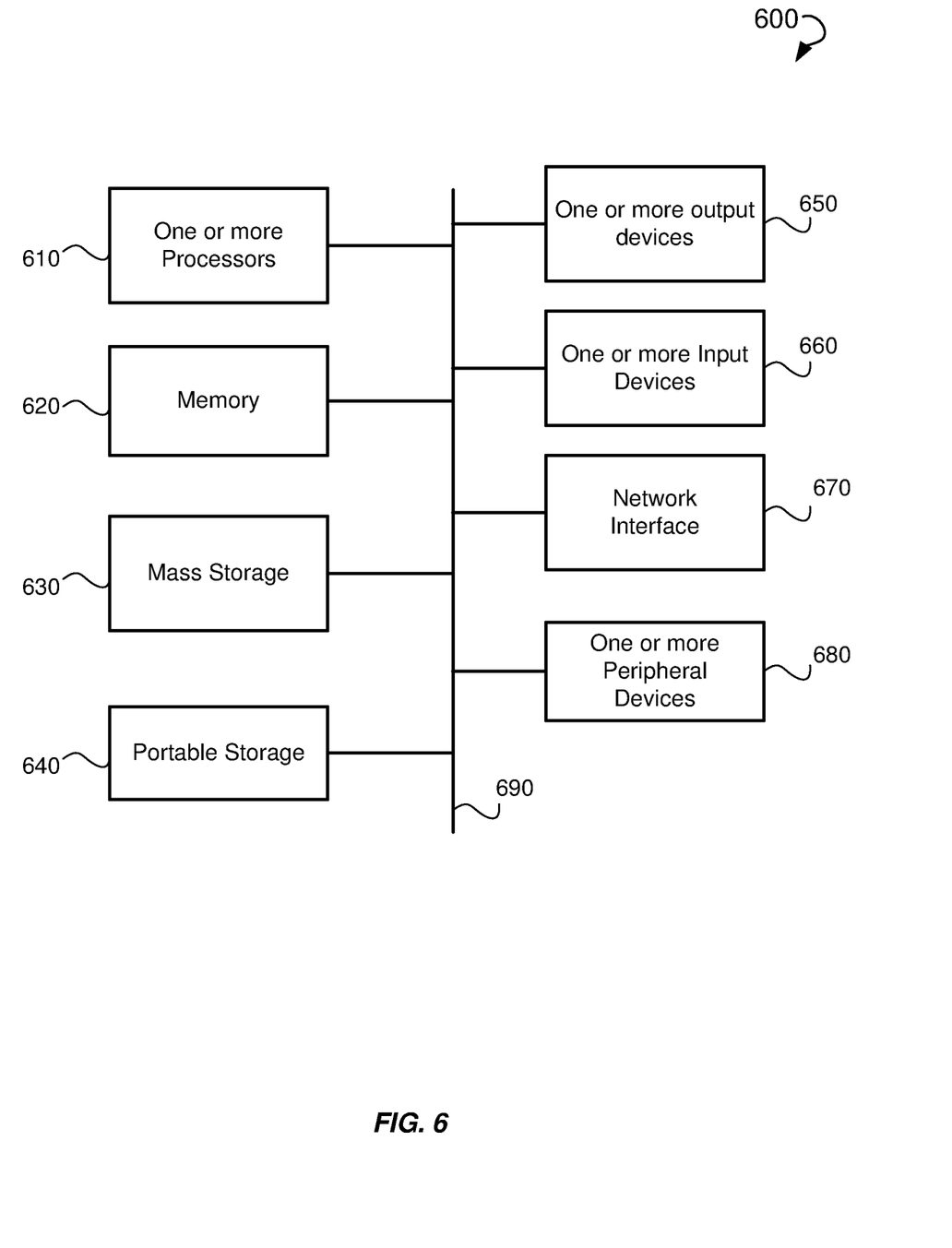
FIG. 6 shows a computing system that can be used to implement a system and a method for assessing an application access risk, according to an example embodiment.

FIG. 6 illustrates an exemplary computing system 600 that can be used to implement embodiments described herein. The computing system 600 can be implemented in the contexts of the system 120 for assessing an application access risk, the graph database 425, and the client devices 110-$i$ (i=1, . . . , N). The exemplary computing system 600 of FIG. 6 may include one or more processors 610 and memory 620. Memory 620 may store, in part, instructions and data for execution by the one or more processors 610. Memory 620 can store the executable code when the exemplary computing system 600 is in operation. The exemplary computing system 600 of FIG. 6 may further include a mass storage 630, portable storage 640, one or more output devices 650, one or more input devices 660, a network interface 670, and one or more peripheral devices 680.

The components shown in FIG. 6 are depicted as being connected via a single bus 690. The components may be connected through one or more data transport means. The one or more processors 610 and memory 620 may be connected via a local microprocessor bus, and the mass storage 630, one or more peripheral devices 680, portable storage 640, and network interface 670 may be connected via one or more input/output buses.

Mass storage 630, which may be implemented with a magnetic disk drive or an optical disk drive, is a non-volatile storage device for storing data and instructions for use by a magnetic disk or an optical disk drive, which in turn may be used by one or more processors 610. Mass storage 630 can store the system software for implementing embodiments described herein for purposes of loading that software into memory 620.

Portable storage 640 may operate in conjunction with a portable non-volatile storage medium, such as a compact disk (CD) or digital video disc (DVD), to input and output data and code to and from the computing system 600 of FIG. 6. The system software for implementing embodiments described herein may be stored on such a portable medium and input to the computing system 600 via the portable storage 640.

One or more input devices 660 provide a portion of a user interface. The one or more input devices 660 may include an alphanumeric keypad, such as a keyboard, for inputting alphanumeric and other information, or a pointing device, such as a mouse, a trackball, a stylus, or cursor direction keys. Additionally, the computing system 600 as shown in FIG. 6 includes one or more output devices 650. Suitable one or more output devices 650 include speakers, printers, network interfaces, and monitors.

Network interface 670 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 670 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 680 may include any type of computer support device to add additional functionality to the computing system. The one or more peripheral devices 680 may include a modem or a router.

The components contained in the exemplary computing system 600 of FIG. 6 are those typically found in computing systems that may be suitable for use with embodiments described herein and are intended to represent a broad category of such computer components that are well known in the art. Thus, the exemplary computing system 600 of FIG. 6 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM.

Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, systems and methods for assessing an application access risk are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for assessing an application access risk, the system comprising:
    at least one processor; and
    a memory communicatively coupled to the at least one processor, the memory storing instructions executable by the at least one processor to perform a method comprising:
        collecting data concerning relationships between an application and one or more client devices in a computing environment;
        collecting data concerning relationships between the application and one or more users logged into the one or more client devices in the computing environment;
        enriching data related to the one or more client devices with the one or more users logged into the one or more client devices;
        updating a graph database including nodes representing the application, the one or more client devices, and the one or more users and edges representing the relationships between the application and the one or more client devices and the relationships between the application and the one or more users;
        enriching the graph database by associating the nodes with metadata including information concerning the one or more users accessing the application from the one or more client devices, attributes associated with the one or more users, and permissions associated with the one or more users;
        analyzing the graph database to identify a subset of nodes used to access the application;
        displaying, via a graphical user interface, a graphical representation of the subset of nodes;
        generating allow-list rules identifying at least one user of the one or more users and at least one client device of the one or more client devices permitted to access the application; and
        generating an allow-list set of role-based access control permissions to enforce the access.

2. The system of claim 1, wherein the at least one processor is further configured to:
    determine that the subset of nodes includes at least one node representing at least one of a client device, a user, and a group of users not allowed to have access to the application; and
    in response to the determination, providing a warning message to a least one authorized person.

3. The system of claim 1, wherein the at least one processor is further configured to:
    determine that the subset of nodes includes one of:
        at least one node representing a client device of a user not allowed to have access to the application; and
        at least one node representing a user not allowed to have access to the application; and
    in response to the determination, generate a security policy disallowing a relationship between the application and the at least one node, wherein the at least one node is associated with one of the client device, the user, or a group of users defined within the metadata by organizational units, roles, and groups.

4. The system of claim 1, wherein the metadata includes information on roles of the one or more users and an association of the one or more users with one or more organizational units of an enterprise, types and timestamps of transactions performed by the one or more users using the application.

5. The system of claim 4, wherein the at least one processor is further configured to:
    analyze the graph database to identify a further subset of nodes allowed to have access to the application and not used to access the application;
    identify, based on the metadata, organizational units corresponding to the nodes of the further subset; and
    provide, to at least one authorized person, a report concerning one or more of the organizational units, groups, and the roles corresponding to the nodes of the further subset.

6. The system of claim 5, wherein the at least one processor is further configured to:
    generate a security policy disallowing a relationship between the application and at least one node of the further subset associated with a user of the one or more users.

7. The system of claim 4, wherein the at least one processor is further configured to:
    identify, based on the metadata, organizational units corresponding to the nodes of the subset of nodes used to access the application; and
    provide a report concerning the organizational units to at least one authorized person.

8. The system of claim 4, wherein the at least one processor is further configured to:
    determine, based on the metadata, a number and types of transactions performed by users of at least one of the organizational units; and
    provide a report concerning the number and the types of transactions to at least one authorized person.

9. The system of claim 1, wherein the metadata includes network logs and access logs of the one or more users into the application.

10. The system of claim 1, wherein the metadata includes data concerning a type of operation and an amount of data written to or read from the application.

11. The system of claim 1, further comprising an allow-list architecture.

12. A method for assessing an application access risk, the method comprising:
collecting data concerning relationships between an application and one or more client devices in a computing environment;
collecting data concerning relationships between the application and one or more users logged into the one or more client devices in the computing environment;
enriching data related to the one or more client devices with the one or more users logged into the one or more client devices;
updating a graph database including nodes representing the application, the one or more client devices, and the one or more users and edges representing the relationships between the application and the one or more client devices and the relationships between the application and the one or more users;
enriching the graph database by associating the nodes with metadata including information concerning the one or more users accessing the application from the one or more client devices, attributes associated with the one or more users, and permissions associated with the one or more users;
analyzing the graph database to identify a subset of nodes used to access the application;
displaying, via a graphical user interface, a graphical representation of the subset of nodes;
generating allow-list rules identifying at least one user of the one or more users and at least one client device of the one or more client devices permitted to access the application; and
generating an allow-list set of role-based access control permissions to enforce the access.

13. The method of claim 12, further comprising:
determining that the subset of nodes includes at least one node representing at least one of a client device, a user, and a group of users not allowed to have access to the application; and
in response to the determination, providing a warning message to a least one authorized person.

14. The method of claim 12, further comprising:
determining that the subset of nodes includes one of:
at least one node representing a client device of a user not allowed to have access to the application; and
at least one node representing a user not allowed to have access to the application; and
in response to the determination, generating a security policy disallowing a relationship between the application and the at least one node, wherein the at least one node is associated with one of the client device, the user, or a group of users defined within the metadata by organizational units, roles, and groups.

15. The method of claim 12, further comprising:
analyzing the graph database to identify a further subset of nodes allowed to have access to the application and not used to access the application;
identifying, based on the metadata, organizational units corresponding to the nodes of the further subset; and
providing, to at least one authorized person, a report concerning the organizational units corresponding to the nodes of the further subset.

16. The method of claim 15, further comprising:
generating a security policy disallowing a relationship between the application and at least one node of the further subset.

17. The method of claim 12, further comprising:
identifying, based on the metadata, organizational units corresponding to the nodes of the subset of nodes used to access the application; and
providing a report concerning the organizational units to at least one authorized person.

18. The method of claim 12, further comprising:
determining, based on the metadata, a number and types of transactions performed by users of at least one of organizational units; and
providing a report concerning the number and the types of transactions to at least one authorized person.

19. The method of claim 12, further comprising generating an allow-list architecture.

20. A non-transitory processor-readable medium having embodied thereon a program being executable by at least one processor to perform a method comprising:
collecting data concerning relationships between an application and one or more client devices in a computing environment;
collecting data concerning relationships between the application and one or more users logged into the one or more client devices in the computing environment;
enriching data related to the one or more client devices with the one or more users logged into the one or more client devices;
updating a graph database including nodes representing the application, the one or more client devices, and the one or more users and edges representing the relationships between the application and the one or more client devices and the relationships between the application and the one or more users;
enriching the graph database by associating the nodes with metadata including information concerning the one or more users accessing the application from the one or more client devices, attributes associated with the one or more users, and permissions associated with the one or more users;
analyzing the graph database to identify a subset of nodes used to access the application;
displaying, via a graphical user interface, a graphical representation of the subset of nodes;
generating allow-list rules identifying at least one user of the one or more users and at least one client device of the one or more client devices permitted to access the application; and
generating an allow-list set of role-based access control permissions to enforce the access.

21. The non-transitory processor-readable medium having embodied thereon a program being executable by the at least one processor to perform the method of claim 20, further comprising generating an allow-list architecture.

* * * * *